US007016680B2

(12) United States Patent
Yagi

(10) Patent No.: US 7,016,680 B2
(45) Date of Patent: Mar. 21, 2006

(54) METHOD FOR DETECTING HIGH-SPEED MOVEMENT OF MOBILE COMMUNICATION TERMINAL, MOBILE COMMUNICATION TERMINAL, AND PROGRAM

(75) Inventor: Hideki Yagi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 215 days.

(21) Appl. No.: 10/297,220

(22) PCT Filed: Apr. 4, 2002

(86) PCT No.: PCT/JP02/03390

§ 371 (c)(1),
(2), (4) Date: Jun. 20, 2003

(87) PCT Pub. No.: WO02/082853

PCT Pub. Date: Oct. 17, 2002

(65) Prior Publication Data

US 2004/0053626 A1    Mar. 18, 2004

(30) Foreign Application Priority Data

Apr. 5, 2001 (JP) .............................. 2001-107373
Feb. 15, 2002 (JP) .............................. 2002-037733

(51) Int. Cl.
*H04M 1/66* (2006.01)
*H04M 1/68* (2006.01)
*H04M 3/16* (2006.01)
(52) U.S. Cl. ..................................................... 455/441
(58) Field of Classification Search ............. 455/435.1, 455/441
See application file for complete search history.

(56) References Cited

U.S. PATENT DOCUMENTS 5,530,910 A   6/1996  Taketsugu
5,548,806 A   8/1996  Yamaguchi et al.

FOREIGN PATENT DOCUMENTS

| EP | 0 660 635 A2 | 6/1995 |
|---|---|---|
| JP | 06-224828 | 8/1994 |
| JP | 07-193850 | 7/1995 |
| JP | 08-172662 | 7/1996 |
| JP | 09-261722 | 10/1997 |
| JP | 09-307940 | 11/1997 |
| JP | 2000-209656 | 7/2000 |

OTHER PUBLICATIONS

International Search Report dated Jul. 2, 2002.

*Primary Examiner*—William D. Cumming
(74) *Attorney, Agent, or Firm*—Eric J. Robinson; Robinson Intellectual Property Law Office, P.C.

(57) ABSTRACT

A processing control unit appropriately detects that a mobile communication terminal is moving at a high speed and changes criteria for reselection of a cell. When reselection of a cell occurs, the processing control unit searches a cell transition list (step S10), and determines whether or not a cell selected as a local station by the reselection of a cell has already been registered in the cell transition list (step S11). Upon determining that the cell is not registered, the processing control unit registers the cell selected as the local station in the cell transition list (step S12) and increments a variable N indicating the number of registered cells by one (step S13). Thereafter, when a predetermined measurement termination time elapses, the processing control unit determines whether or not the variable N has exceeded a predetermined threshold value and, upon determining that the variable N has exceeded the predetermined threshold value, considering that the mobile communication terminal is moving at a high speed, changes criteria for reselection of a cell from criteria for preferentially reselecting a cell with relatively narrow coverage to criteria for preferentially reselecting a cell with relatively wide coverage.

9 Claims, 9 Drawing Sheets

FIG. 2

| PLMN ID | CELL ID |
|---|---|
| 0x0123 | 1020 |
| 0x0123 | 456 |
| 0x0123 | 216 |
| 0x0125 | 7442 |
| ⋮ | ⋮ |

METHOD FOR DETECTING HIGH-SPEED MOVEMENT OF MOBILE COMMUNICATION TERMINAL, MOBILE COMMUNICATION TERMINAL, AND PROGRAM

TECHNICAL FIELD

The present invention relates to detection for rapid moving for detecting that a mobile communication terminal, which sends and receives radio signals to perform communication, is moving at a high speed, and for changing criteria for selection of a cell to be a local station.

BACKGROUND ART

For example, a mobile communication terminal such as a cellular telephone communicates by selecting a cell to be a local station out of cells formed by a plurality of base stations and sending and receiving radio signals.

Here, a mobile communication terminal corresponding to the W-CDMA (Wideband-Code Division Multiple Access) system measures qualities of radio signals in a local station and peripheral cells periodically, for example, during waiting. In this case, setting concerning the quality measurement such as designation of peripheral cells to be objects for measuring qualities of radio signals is regulated based on system information notified from the local station.

Such a mobile communication terminal can compare a result of the quality measurement with criteria for reselection of a cell defined in advance, autonomously perform the reselection of a cell to shift a resident zone (zone shift) and switch the local station. Here, a group of parameters for regulating the criteria for reselection of a cell is notified to the mobile communication terminal by system information from the local station.

Here, a mobile communication network may apply an algorism called a hierarchical cell structure (HCS) to regulate the criteria when the mobile communication terminal performs the zone shift. A set value in applying this algorism is notified to the mobile communication terminal by the system information from the local station.

This HCS allocates values indicating an HCS priority to the local station and the peripheral cells using the system information from the local system, and the mobile communication terminal uses this HCS priority in processing for reselecting a cell in switching the local station to perform the zone shift. The HCS priority is for setting criteria for selection for the mobile communication terminal to switch the peripheral cells to the local station for each peripheral cell in performing the zone shift.

That is, for example, the HCS allocates an HCS priority higher than the present local station to peripheral cells for which the mobile communication network side determines preferential selection is desirable in the zone shift by the mobile communication terminal. On the other hand, the HCS allocates an HCS priority lower than the present local station to peripheral cells for which the mobile communication network side determines subordinate selection is desirable.

In addition, in applying this HCS, processing for determining whether or not the mobile communication terminal is moving at a high speed may be executed. A group of parameters used in this determination processing is also notified to the mobile communication terminal by the system information from the local station.

This determination processing determines whether or not the number of times the mobile communication terminal reselects cells and performs the zone shift during the period until a predetermined measurement termination time T_CR_MAX elapses has exceeded a predetermined threshold value N_CR and, if it is determined that the threshold value has been exceeded, considers the mobile communication terminal is in a rapid moving state to change the criteria for reselection of a cell.

For example, in ordinary criteria for reselection of a cell (in a non-rapid moving state), cells with a higher HCS priority is selected preferentially. On the other hand, in criteria for reselection of a cell in a rapid moving state, cells with a lower HCS priority is selected preferentially.

In this case, this means that the mobile communication network regulates such that cells with a high HCS priority is selected preferentially when the mobile communication terminal is in the non-rapid moving state and cells with a low HCS priority is selected preferentially when the mobile communication terminal is in the rapid moving state.

For example, FIG. 8 is a flow chart for explaining an example of processing for detecting that a conventional moving communication terminal is moving at a high speed.

The mobile communication terminal initializes a variable V_CR, which indicates the number of times cells are reselected during the period until a predetermined measurement termination time T_CR_MAX elapses, as zero (step S20).

Next, the mobile communication terminal starts up a measurement section timer for measuring time to measure the number of times of reselection of a cell to make it possible to detect that the predetermined measurement termination time T_CR_MAX has elapsed (step S21).

The mobile communication terminal determines whether or not reselection of a cell has occurs (step S22) and, upon determining that reselection of a cell has occurred (YES in step S22), increments the variable V_CR by one (step S23). On the other hand, upon determining that reselection of a cell has not occurred (NO in step S22), the mobile communication terminal determines whether or not time measured by the timer has passed the measurement termination time T_CR_MAX (step S24).

Upon determining that the time measured by the timer has not passed the measurement termination time T_CR_MAX (NO in step S24), the mobile communication terminal returns the processing to step S22 and detects occurrence of reselection of a cell.

On the other hand, upon determining that the time measured by the timer has passed the measurement termination time T_CR_MAX (YES in step S24), the mobile communication terminal determines whether or not the number of times of reselection indicated by the variable V_CR has exceeded a predetermined threshold value N_CR (step S25).

Upon determining that the number of times of reselection indicated by the variable V_CR has not exceeded the threshold value N_CR (NO in step S25), the mobile communication terminal returns the processing to step S20 and continues the processing for detecting movement at a high speed.

On the other hand, upon determining that the number of times of reselection indicated by the variable V_CR has exceeded the threshold value N_CR (YES in step S25), the mobile communication terminal, considering that it has been detected that it is moving at a high speed, executes processing for shifting to a rapid moving state such as changing criteria for reselection of a cell (step S26).

PROBLEMS TO BE SOLVED BY THE INVENTION

In the above-described conventional mobile communication terminal, it is detected that the mobile communication terminal is moving at a high speed with the number of reselection of a cell indicated by the variable V_CR as criteria. That is, in the convention mobile communication terminal, even if an identical cell is selected as a local station for a plurality of times during the period until a predetermined measurement termination time elapses, the number of times is counted without distinguishing the selection of the identical cell from the selection of other cells.

Thus, for example, if an identical cell is selected repeatedly as a local station for many times due to a reason that the mobile communication terminal exists in a boundary of a cell, or the like, the mobile communication terminal shifts to a rapid moving state regardless of the fact that it is not actually moving at a high speed.

Since criteria for reselection of a cell are also changed if the mobile communication terminal shifts to the rapid moving state differently from the reality, a problem occurs in that an inappropriate peripheral cell is selected preferentially.

The present invention has been devised in view of the above-described actual situation, and it is an object of the present invention to provide detection for rapid moving of a mobile communication terminal that can appropriately detect that a mobile communication terminal is moving at a high speed.

DISCLOSURE OF THE INVENTION

In order to attain the above-described object, detection for rapid moving of a mobile communication terminal in accordance with a first aspect of the present invention is detection for rapid moving of a mobile communication terminal that is capable of changing criteria for reselection of a cell to be criteria for switching a local station in association with a result of determining whether or not the mobile communication terminal is moving at a high speed and comparing a result of measuring qualities of radio signals with the criteria for reselection of a cell to switch a cell to be the local station, which is characterized in that:

the mobile communication terminal determines, upon reselecting a cell to be the local station, whether or not a cell selected as the local station is registered in a predetermined list;

if it determines that the cell is not registered, the mobile communication terminal registers the cell selected as the local station in the list;

when a predetermined measurement termination time elapses, the mobile communication terminal determines whether or not the number of a cell registered in the list exceeds a predetermined threshold value; and if it determines that the number of a cell exceeds the threshold value, considering that it is moving at a high speed, the mobile communication terminal changes the criteria for reselection of a cell from criteria for preferentially reselecting a cell with a relatively narrow coverage to criteria for preferentially reselecting a cell with a relatively wide coverage.

It is desirable to register the cell selected as the local station in the list by causing a predetermined memory unit to store data indicating identification information peculiar to the cell selected as the local station.

It is desirable that the coverage of the cell reselected preferentially if it is determined that the number of a cell registered in the list has exceeded the predetermined threshold value and the coverage of the cell reselected preferentially if it is determined that the number of a cell registered in the list is equal to or less than the predetermined threshold value have areas overlapping with each other.

It is desirable that the cell reselected preferentially if it is determined that the number of a cell registered in the list has exceeded the predetermined threshold value is a macro cell, and the cell reselected preferentially if it is determined that the number of a cell registered in the list is equal to or less than the predetermined threshold value is a micro-cell or a pico-cell.

A mobile communication terminal in accordance with a second aspect of the present invention is characterized by comprising:

communication means for sending and receiving radio signals to and from a base station to perform communication;

cell information memory means for registering a cell selected as a local station by storing information for identifying the cell selected as the local station; and processing control means for, when a cell with which the communication means communicates as the local station is reselected, searching information stored in the cell information memory means to determine whether or not the cell selected as the local station is registered and, upon determining that the cell is not registered, causing the cell information memory means to store information for identifying the cell selected as the local station and registering the cell, when a predetermined measurement termination time elapses, determining whether or not the number of a cell registered in the cell information memory means exceeds a predetermined threshold value and, upon determining that the number of a cell exceeds the predetermined threshold value, considering that it is moving at a high speed, changing criteria for reselection of a cell to be criteria in switching the local station based on a result of measuring qualities of radio signals from criteria for preferentially reselecting a cell with a relatively narrow coverage to criteria for preferentially reselecting a cell with relatively wide coverage.

A program in accordance with a third aspect of the present invention is characterized in that the program causes a computer functioning as a mobile communication terminal to execute:

registration determination processing for, when a cell to be a local station is reselected, determining whether or not the cell selected as the local station is registered in a predetermined list;

cell registration processing for, if it is determined in the registration determination processing that the cell selected as the local station is not registered, registering the cell selected as the local station in the list;

the number of a cell determination processing for, when a predetermined measurement termination time elapses, determining whether or not the number of a cell registered in the list has exceeded a predetermined threshold value;

shift to rapid moving state processing for, if it is determined in the number of a cell determination processing that the number of a cell has exceeded the threshold value, considering that the mobile communication terminal is moving at a high speed, changing criteria for reselection of a cell to be criteria in switching the local station based on a result of measuring qualities of radio signals from criteria for preferentially reselecting a cell with a relatively narrow coverage to criteria for preferentially reselecting a cell with relatively wide coverage.

It is desirable that the cell registration processing registers the cell selected as the local station in the list by causing a predetermined memory unit to store data indicating identification information peculiar to the cell selected as the local station.

BRIEF DESCRIPTION OF THE DRAWINGS

FIG. 2 is a table showing a cell transition list;

BEST MODE FOR CARRYING OUT THE INVENTION

A mobile communication terminal in accordance with an embodiment of the present invention will be hereinafter described in detail with reference to the drawings.

Figure 1:
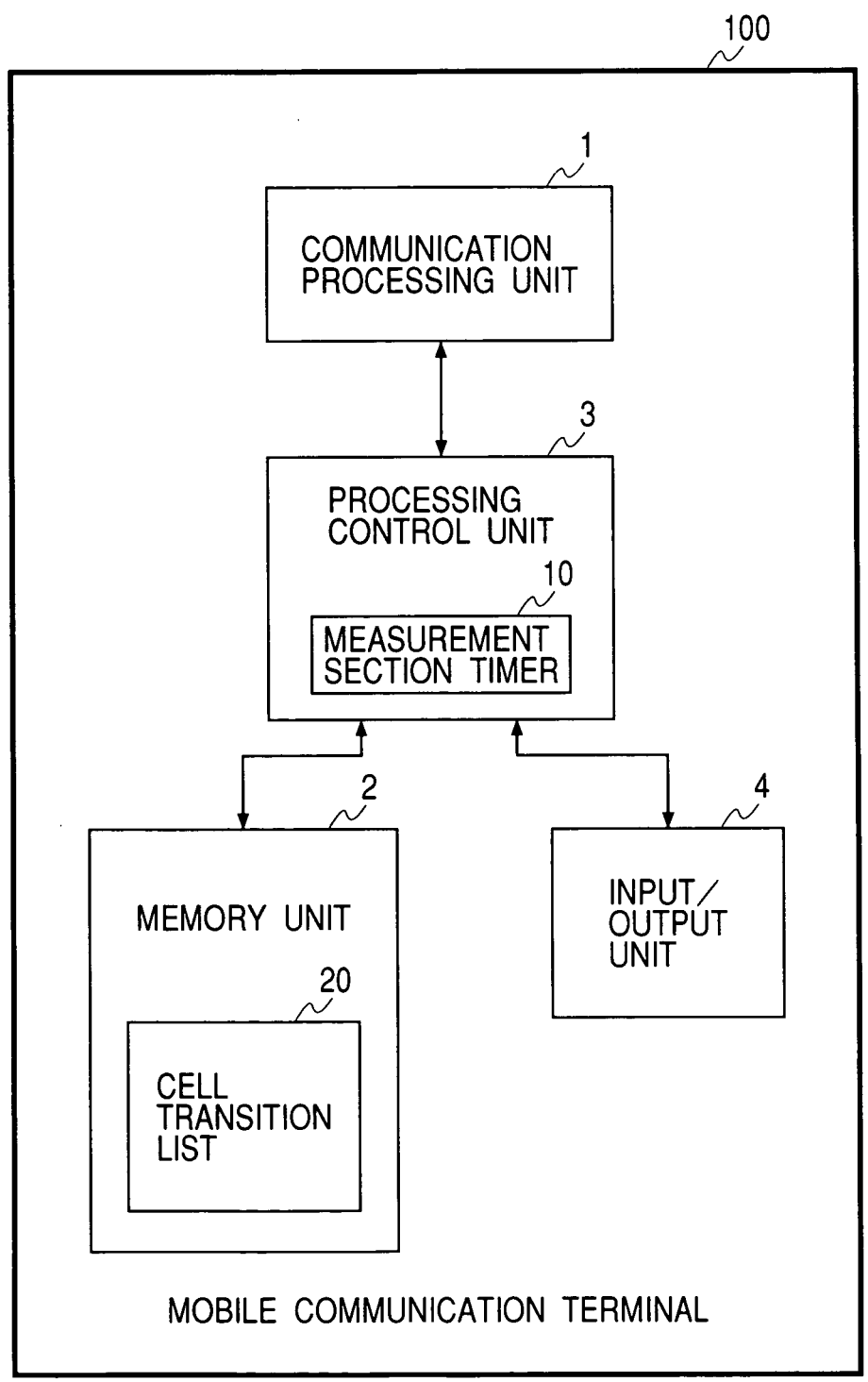
FIG. 1 is a diagram showing a structure of a mobile communication terminal in accordance with an embodiment of the present invention.

FIG. 1 is a diagram showing a structure of a mobile communication terminal 100 in accordance with the embodiment of the present invention.

As shown in the figure, this mobile communication terminal 100 is provided with a communication processing unit 1, a memory unit 2, a processing control unit 3 and an input/output unit 4.

The communication processing unit 1 is constituted, for example, by an antenna, an RF (Radio Frequency) signal processing circuit and a base band signal processing circuit and is for communicating by sending and receiving radio signals to and from base stations provided in a mobile communication network.

The memory unit 2 is constituted by, for example, an EEPROM (Electronically Erasable and Programmable Read Only Memory) and an SRAM (Static Random Access Memory) and stores an operation program or data regulating operations of the processing control unit 3.

In addition, the memory unit 2 stores data forming a cell transition list 20 as shown in FIG. 2, for example, by an RAM.

The cell transition list 20 stores information concerning a cell that the mobile communication terminal 100 selects as a local station by zone shift during the period until a predetermined measurement termination period T_CR_MAX elapses. For example, the cell transition list 20 stores data indicating a "PLMN ID" (Public Land Mobile Network ID) and a "cell ID", thereby registering the cell selected as the local station.

Here, the "PLMN ID" is identification information for identifying a carrier of the mobile communication network that provides the cell selected as the local station.

The "cell ID" is an identification number that is allocated to a cell covered by each base station provided in the mobile communication network. Here, as the "cell ID", a value peculiar is allocated for each cell in each communication carrier.

In addition, the memory unit 2 stores various kinds of information included in system information received from a base station installed in the cell selected as the local station. For example, the memory unit 2 stores a variable N indicating the number of cells registered in the cell transition list 20 and a threshold value N_CR to be criteria in determining whether or not the mobile communication terminal 100 is moving at a high speed based on the number of effective entries of the cell transition list. Moreover, the memory unit 2 stores data indicating the predetermined measurement termination time T_CR_MAX measured by a measurement section timer 10 provided in the processing control unit 3.

The processing control unit 3 is constituted by a microprocessor or the like, for example, a CPU (Central Processing Unit), and is for controlling operations of the entirety of this mobile communication terminal 100.

For example, the processing control unit 3 executes an operation program stored in the memory unit 2, which is discussed later, and controls the communication processing unit 1 or the like to execute various kinds of processing such as a rapid moving detection processing shown in a flow chart of FIG. 5 and update processing of a cell transition list shown in a flow chart of FIG. 6.

Figure 5:
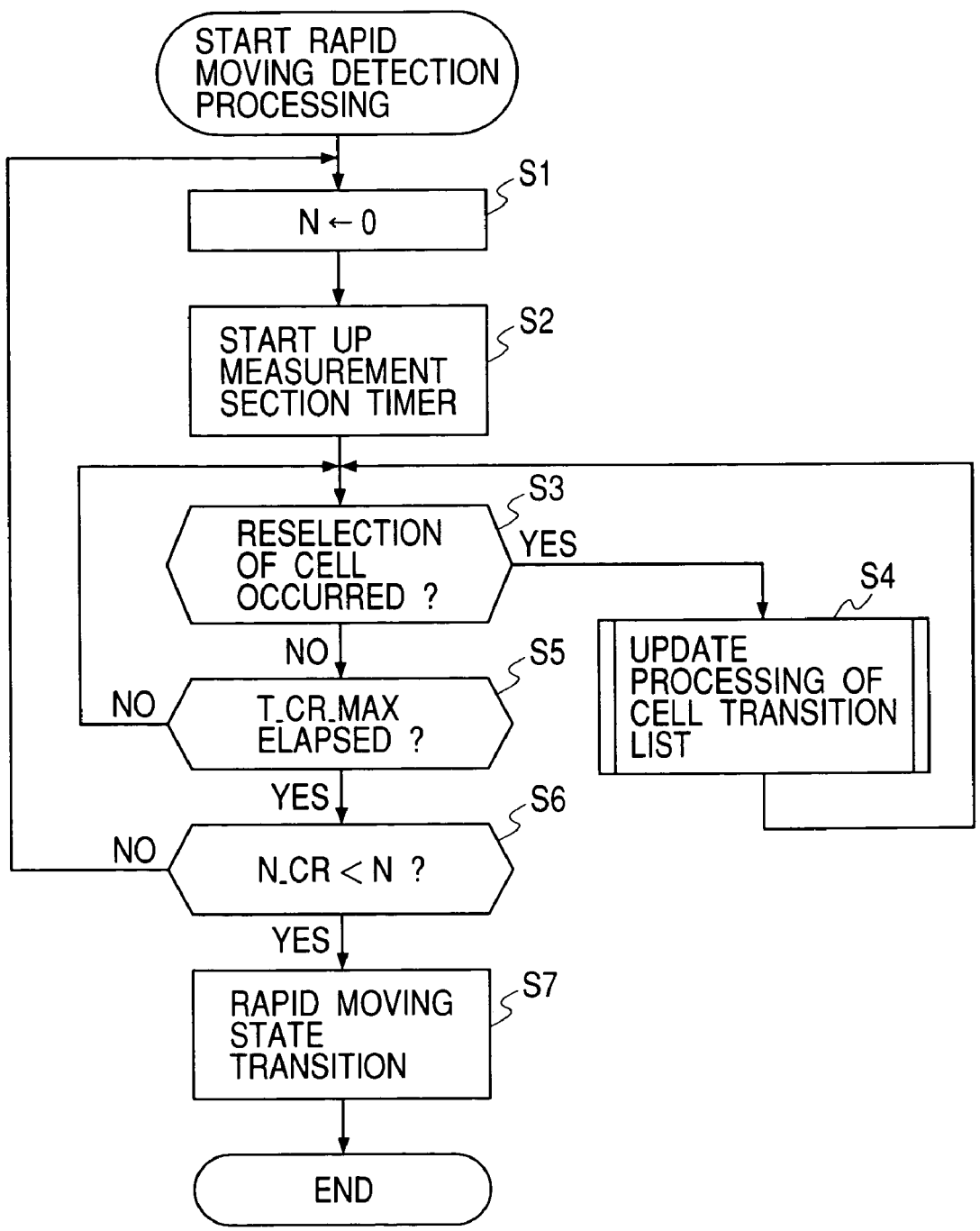
FIG. 5 is a flow chart for explaining processing for detecting rapid moving.

In addition, the processing control unit 3 is provided with the measurement section timer 10 for detecting that the predetermined measurement termination time T_CR_MAX has elapsed in executing the rapid moving detection processing shown in the flow chart of FIG. 5. This measurement section timer 10 is realized by, for example, the processing control unit 3 executing a predetermined operation program stored in the memory unit 2.

The input/output unit 4 is constituted by a key pad, a liquid crystal display, a speaker, a microphone, a light-emitting diode and the like, and is for providing a user interface to input or output various kinds of information.

Next, a structure of a mobile communication system to which this mobile communication terminal 100 is applied will be described.

Figure 3:
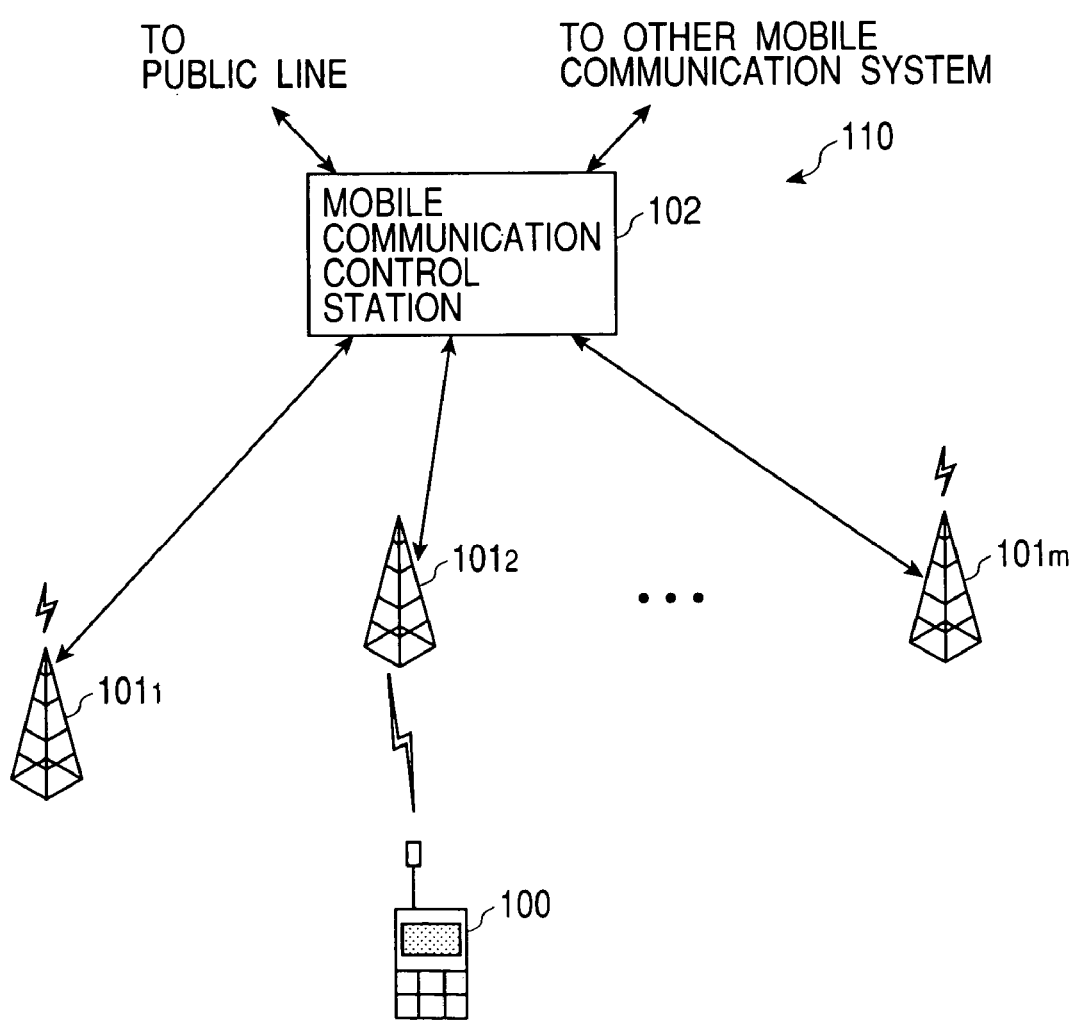
FIG. 3 is a diagram showing a mobile communication system to which the mobile communication terminal is applied.

FIG. 3 is a diagram showing the structure of the mobile communication system to which the mobile communication terminal 100 is applied.

This mobile communication system is a system that allows communication by the mobile communication terminal 100 using, for example, the W-CDMA (Wideband-Code Division Multiple Access) system and, as shown in FIG. 3, is provided with a mobile communication network 110 that is constituted by combining a plurality of base stations $101_1$, $101_2, \ldots, 101_m$ (m is a natural number) and the mobile communication control station 102.

The plurality of base stations $101_1$ to $101_m$ set a radio line by at least any one base station sending and receiving radio signals to and from the mobile communication terminal 100. The base stations $101_1$ to $101_m$ are installed in a plurality of a cell for allowing communication by the mobile communication terminal 100, respectively, and provides a mobile communication service with an area covered by each cell as a communication service area.

In addition, a peculiar identification number is given to each base station $101_1$ to $101_m$ and is notified to the mobile communication terminal 100 as a "cell ID" together with a "PLMN ID" by system information sent by each base station $101_1$ to $101_m$.

Moreover, each base station $101_1$ to $101_m$ notifies a peripheral cell, which becomes an object for which the mobile communication terminal 100 measures qualities of radio signals in order to reselect the cell selected as the local station to perform zone shift, to the mobile communication terminal 100 by system information.

A mobile communication control station 102 is for providing a radio communication line for a mobile body, and the plurality of base stations $101_1$ to $101_m$ are coupled by wire or wireless.

In addition, the mobile communication control station 102 is coupled to a public line, other mobile communication system or the like to allow communication between the mobile communication terminal 100 and other communication devices.

Operations of the mobile communication terminal 100 in accordance with the embodiment of the present invention will be hereinafter described.

For example, during waiting, this mobile communication terminal 100 measures qualities of radio signals in the local station and peripheral cells and attempts to reselect the cell selected as the local station.

Here, the mobile communication network 110 applies an algorism called a hierarchical cell structure (HCS) to regulate criteria for the mobile communication terminal 100 to perform zone shift.

Figure 4:
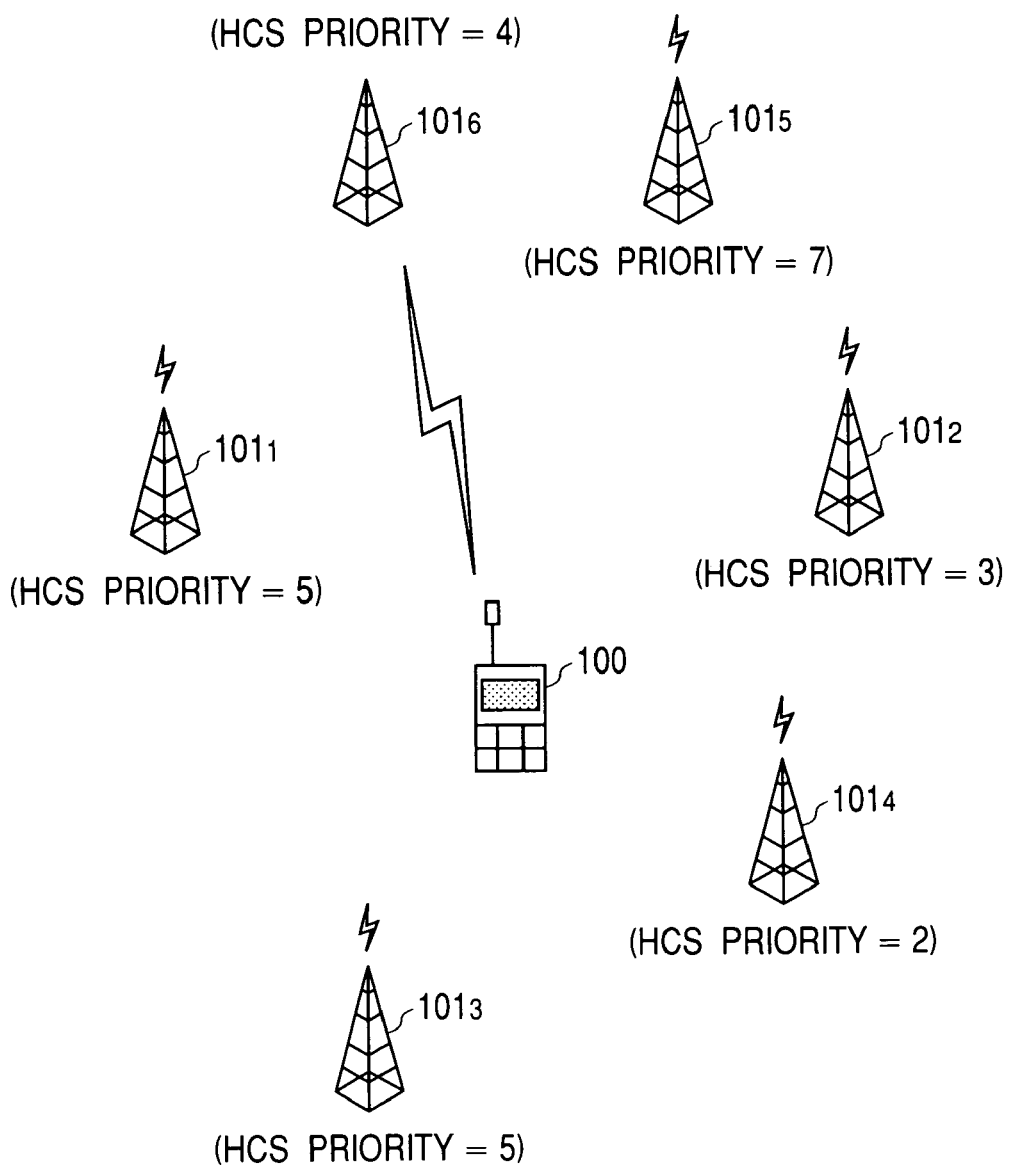
FIG. 4 is a diagram for explaining an operation for applying an HCS to select a cell to be a local station.

For example, as shown in FIG. 4, it is assumed that a plurality of a cell, which have base stations $101_1$ to $101_5$, respectively, exist as peripheral cells, and the mobile communication terminal 100 selects a base station $101_6$ as a local station.

In addition, it is assumed that, as a result of the mobile communication terminal 100 measuring qualities of radio signals, it is evaluated that each cell having the base stations $101_1$ to $101_4$ is an object of reselection and each cell having the base stations $101_5$ and $101_6$ is not an object of reselection.

That is, the mobile communication terminal 100 executes predetermined calculation processing using, for example, quality measurement values of radio signals sent from respective base stations $101_5$ and $101_6$, detects that a value obtained as a result of the calculation is less than a predetermined pruning level and excludes each cell having the base stations $101_5$ and $101_6$ from objects of reselection.

Here, if the mobile communication terminal 100 switches a cell selected as the local station taking into account an HCS priority, the mobile communication terminal 100 compares the HCS priority of each peripheral cell having the base stations $101_1$ to $101_4$ evaluated as objects of reselection to select a cell with a high HCS priority preferentially.

This HCS priority is notified to the mobile communication terminal 100 by system information from the cell selected as the local station.

For example, if cells having the base stations $101_1$ and $101_3$ have an identical priority, which is a highest priority (HCS priority=5) among the cells evaluated as objects of reselection, the mobile communication terminal 100 excludes each cell having the base stations $101_2$ and $101_4$ from objects of reselection.

Thereafter, based on a result of measuring qualities of radio signals in each cell having the base stations $101_1$ and $101_3$, the processing control unit 3 performs cell ranking and switches the local station to a cell capable of sending and receiving a radio signal of a better quality.

In a mobile communication system that regulates criteria for reselection of a cell using such an HCS, zone shift can be performed appropriately by changing the criteria for reselection of a cell in association with a moving speed of the mobile communication terminal 100.

That is, the mobile communication terminal 100 adapts different criteria for reselection of a cell between a rapid moving state and a non-rapid moving state to switch a local station, thereby being able to maintain a good waiting state or a communication state even if it is moving at a high speed.

For example, the mobile communication terminal 100 preferentially selects a cell with a higher HCS priority in normal criteria for reselection of a cell (in a non-rapid moving state). On the other hand, the mobile communication terminal 100 preferentially selects a cell with a lower HCS priority in criteria for reselection of a cell in a rapid moving state. Information concerning these criteria for reselection of a cell is notified to the mobile communication terminal 100 by system information from a cell selected as a local station.

That is, in this case, this means that the mobile communication network 110 regulates such that the mobile communication terminal 100 preferentially selects a cell with a high HCS priority in the non-rapid moving state and preferentially selects a cell with a low HCS priority in the rapid moving state.

A concrete allocation policy of HCS priorities can be arbitrarily set according to an implementation format of the mobile communication network 110. For example, setting as described below is possible.

Figure 9:
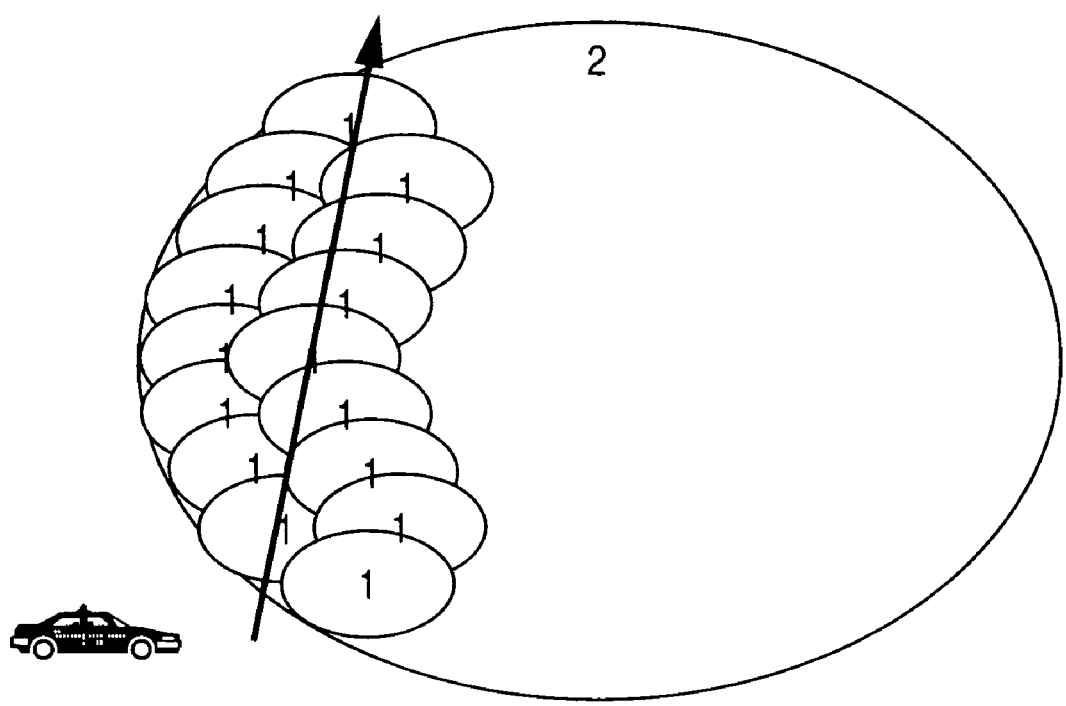
FIG. 9 is a diagram showing pico-cells (micro-cells) and a micro-cell.

That is, it is possible to set an HCS priority high for a cell with a relatively narrow coverage and set an HCS priority low for a cell with a relatively narrow coverage. Here, a cell with a relatively narrow coverage is generally referred to as a pico-cell or a micro-cell (1 in FIG. 9). Such a pico-cell is disposed in places where many people gather and traffic is concentrated, for example, high-rises, stations and downtowns in order to secure a communication capacity. In addition, such a pico-cell or a micro-cell is disposed to reduce a distance between the mobile communication terminal 100 and a base station, whereby it is likely that transmission power in the mobile communication terminal 100 is saved to control consumption of a battery. A cell with a relatively narrow coverage such as a pico-cell or a micro-cell is disposed overlapping with a cell with a relatively wide coverage referred to as a micro-cell (2 in FIG. 9).

If an existing place of a mobile communication terminal moves at a low speed or stays in a fixed place, it is desirable to select a pico-cell or a micro-cell preferentially from the viewpoint of dispersion of the aforementioned traffic or control of power consumption. On the other hand, since zone shift frequently occurs when a cell with a narrow coverage is selected in rapid moving, problems such as increase in traffic due to increase in the number of accesses to a mobile communication network or frequent cut-off of communication occur.

Thus, the mobile communication terminal 100 adopts criteria for reselection of a cell for preferentially selecting a macro-cell with a relatively wide coverage in rapid moving, thereby being able to solve this problem. Moreover, the mobile communication terminal 100 may be able to control consumption of a battery to be a power source of it.

In addition, as another example, it is possible to set an HCS priority high for a peripheral cell close to a present local station and set an HCS priority low for a peripheral cell far from the present local station.

In this case, in a non-rapid moving state, even if a quality of a radio signal in the cell far from the local station is good, if it is evaluated that the local station or other peripheral cells with a high priority are objects of reselection, the mobile communication terminal 100 never selects a cell far from the local station. Therefore, even if a quality of a radio signal in a peripheral cell far from the local station is temporarily improved, the cell can be prevented from being immediately switched to the local station. Consequently, such a situation can be avoided in which zone shift between an original local station and a cell far from it occurs frequently or the mobile communication terminal 100 cannot return to an original local state but is determined to be out of area and has to execute cell search.

On the other hand, in a rapid moving state, the mobile communication terminal 100 sets an HCS priority in peripheral cells adjacent to the local cell high and sets an HCS priority in a peripheral cell adjacent to those peripheral cells low, thereby being able to realize zone shift corresponding to rapid moving.

That is, if a radio signal provided in one cell has a quality of a degree that allows communication in adjacent peripheral cells, in a peripheral cell adjacent to a cell selected as the local station, the mobile communication terminal 100 can switch the local station with a peripheral cell that is adjacent to the peripheral cell as an object of reselection preferentially.

The mobile communication terminal 100 that is capable of setting criteria for reselection of a cell based on such an HCS executes rapid moving detection processing shown in the flow chart of FIG. 5 in order to appropriately detect that it is moving at a high speed.

The rapid moving detection processing executed by the mobile communication terminal 100 will be hereinafter described.

The processing control unit 3 starts execution of the rapid moving detection processing by executing an operation program stored in the memory unit 2.

Upon starting the rapid moving detection processing, the processing control unit 3 sets a variable N stored in the memory unit 2 to zero (step S1). That is, the processing control unit 3 clears the cell transition list 20 to set it to a state without a registered cell to be an effective entry.

However, concerning data specifically stored as a cell transition list 20 in the memory unit 2, since the variable N indicating the number of registered cells is used to control the number of entries, it is unnecessary to apply initialization such as erasing of stored contents in particular.

The processing control unit 3 initializes to start up the measurement section timer 10 (step S2) and starts measurement of elapsed time to the measurement termination time T_CR_MAX.

Thereafter, the processing control unit 3 determines whether or not reselection of a cell has occurred (step S3).

Figure 6:
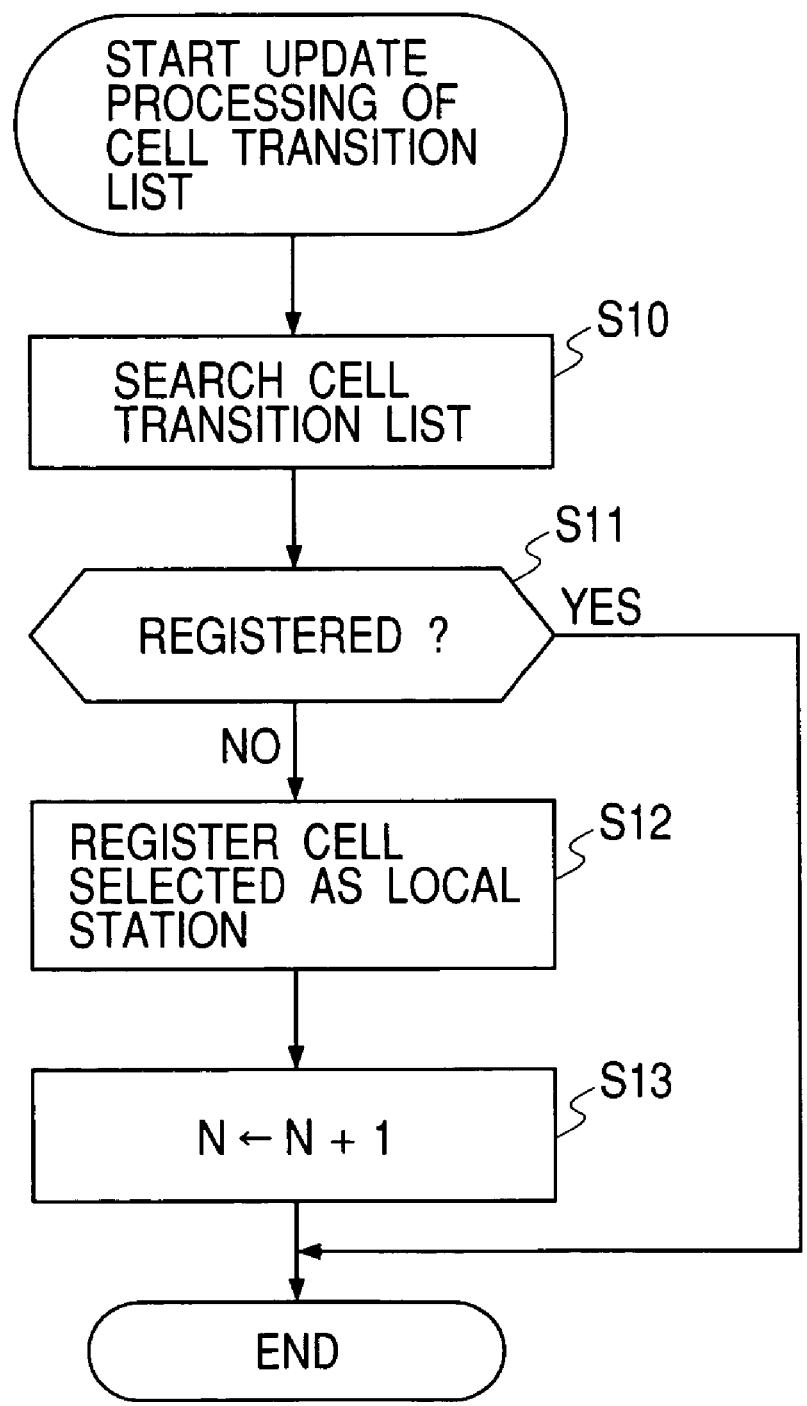
FIG. 6 is a flow chart for explaining processing for updating the cell transition list.

Upon determining that reselection of a cell occurred (YES in step S3), the processing control unit 3 executes update processing of a cell transition list shown in the flow chart of FIG. 6 (step S4).

Upon starting the update processing of a cell transition list, the processing control unit 3 searches the cell transition list 20 stored in the memory unit 2 (step S10), and determines whether or not a cell selected as a local station by reselection of a cell has already been registered in the cell transition list 20 (step S11).

Upon determining that the cell is registered in the cell transition list 20 (YES in step S11), the processing control unit 3 finishes the update processing of a cell transition list as it is and returns the processing to step S3 of FIG. 5.

That is, the processing control unit 3 prevents a cell selected as a local station by reselection of a cell from being registered duplicately in the cell transition list 20 and makes it possible to measure the accurate number of cells selected as the local station during the period until the measurement termination time T_CR_MAX elapses.

On the other hand, upon determining that the cell selected as the local station is not registered in the cell transition list 20 yet (NO in step S11), the processing control unit 3 registers the cell selected as the local station in the cell transition list 20 (step S12). That is, the processing control unit 3 stores information indicating an identification number of the local station notified by system information from the local station as a "PLMN ID" or a "cell ID" of the cell transition list 20.

Thereafter, after incrementing the variable N by one (step S13), the processing control unit 3 finishes the update processing of a cell transition list and returns the processing to step S3 of FIG. 5.

In addition, in step S3, upon determining that reselection of a cell has not occurred (NO in step S3), the processing control unit 3 reads time measured by the measurement section timer 10 and determines whether or not the measurement terminal time T_CR_MAX has elapsed (step S5).

Upon determining that the measurement termination time T_CR_MAX has not elapsed (NO in step S5), the processing control unit 3 returns the processing to S3 and detects occurrence of reselection of a cell.

On the other hand, upon determining that the measurement termination time T_CR_MAX has elapsed (YES in step S5), the processing control unit 3 determines whether or not the number of registered cells of the cell transition list 20 indicated by the variable N has exceeded the predetermined threshold value N_CR (step S6).

Upon determining that the number of registered cells has not exceeded the threshold value N_CR (NO in step S6), the processing control unit 3 returns the processing to step S1 and executes the rapid moving detection processing again.

On the other hand, upon determining that the number of registered cells has exceeded the threshold value N_CR (YES in step S6), the processing control unit 3 considers that the mobile communication terminal 100 is moving at a high speed and executes processing for transitioning to the rapid moving state such as changing criteria for reselection of a cell (step S7).

For example, the processing control unit 3 changes criteria for reselection of a cell from criteria for preferentially reselecting a micro-cell or a pico-cell with a relatively narrow coverage to criteria for preferentially reselecting a macro-cell with a relatively wide coverage.

Thereafter, the processing control unit 3 finishes the rapid moving detection processing shown in the flow chart of FIG. 5.

In this way, the processing control unit 3 counts the number of cells registered in the cell transition list 20 and compares the number of cells with the threshold value N_CR, thereby being able to count the number of cells selected as the local station without counting identical cells duplicately.

Consequently, the processing control unit 3 can detect that the mobile communication terminal 100 is moving at a high speed.

Figure 7:
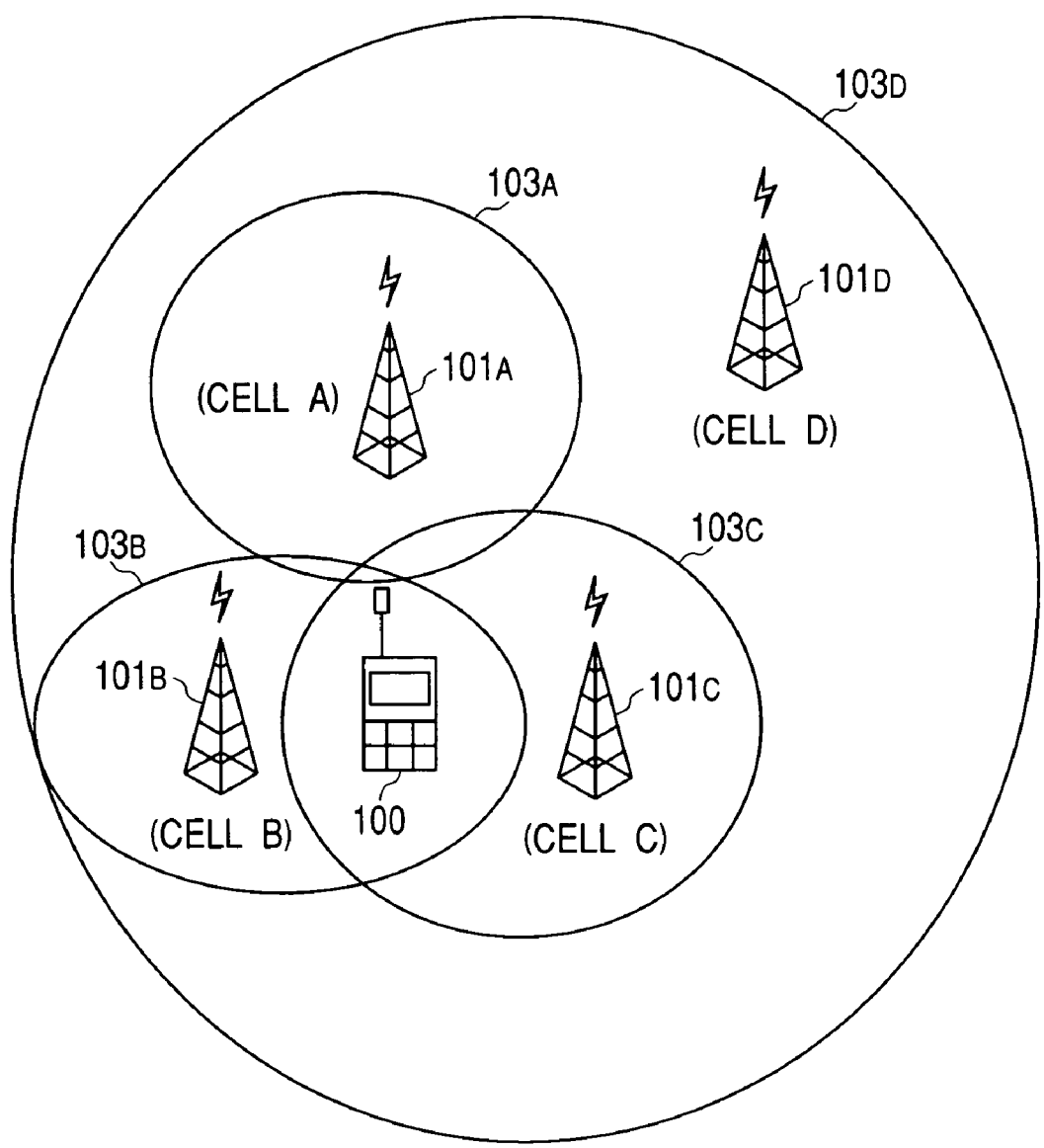
FIG. 7 is a diagram for explaining a specific example of an operation of the mobile communication terminal.
Figure 8:
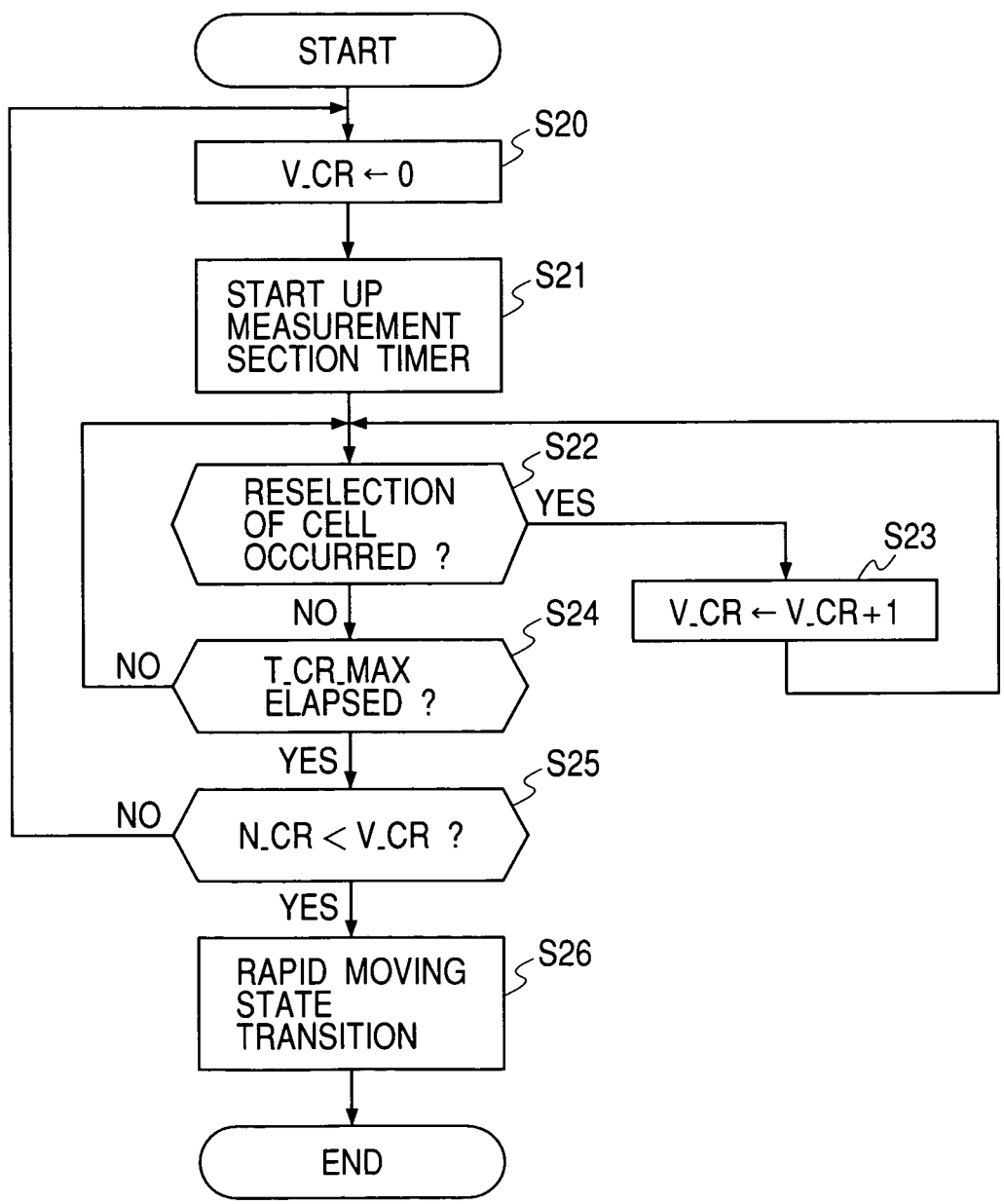
FIG. 8 is a flow chart for explaining processing for detecting that a conventional mobile communication terminal is moving at a high speed.

For example, as shown in FIG. 7, it is assumed that the mobile communication terminal 100 exists in the vicinity of a boundary of a cell $103_A$ (cell A) having a base station $101_A$, a cell $103_B$ (cell B) having a base station $101_B$ and a cell $103_C$ (cell C) having a base station $101_C$.

In addition, it is assumed that the cell A to the cell C are pico-cells with coverage overlapping a cell 103D (cell D) having a base station 101D, and notifies the mobile communication terminal 100 of the cell D that is a macro-cell by system information as a peripheral cell with an HCS priority lower than that of the local station.

Under this situation, it is assumed that the mobile communication terminal 100 switches the local station repeatedly among the three cells A to C, for example, in such a manner as the cell A, the cell B, the cell A, the cell C, the cell B, the cell C, . . . , the cell A.

In this case, information for identifying the cell A to the cell C is registered in the cell transition list 20 without being duplicated, and the variable N indicating the number of effective entries of the cell transition list 20 equals to 3.

Therefore, if the predetermined threshold value N_CR is set as N_CR 3, the processing control unit 3 never detects that the mobile communication terminal 100 is moving at a high speed. Consequently, even if a quality of a radio signal in the cell D increases temporarily, the processing control unit 3 can prevent the mobile communication terminal 100 from selecting the cell D with a low HCS priority as a local station. That is, the mobile communication terminal 100 can appropriately detects a rapid moving state and changes criteria for reselection of a cell from criteria for preferentially reselecting a pico-cell or a micro-cell with a relatively narrow coverage to criteria for preferentially reselecting a macro-cell with a relatively wide coverage.

As described above, since it is made possible to appropriately detect the rapid moving state and change criteria for reselection of a cell, the mobile communication terminal 100 can prevent increase in traffic and stabilize communication. In addition, in the non-rapid moving state, the mobile communication terminal 100 can prevent a macro-cell from being selected erroneously and select a pico-cell or a micro-cell in its vicinity appropriately. Consequently, necessities for increasing transmission power in accordance with a radio communication path becoming long distance can be reduced and consumption of a battery can also be controlled by making it possible to save transmission power.

In this way, the mobile communication terminal 100 in accordance with the embodiment of the present invention registers cells selected as a local station in the cell transition list without duplication and determines whether or not it is moving at a high speed based on the number of registered cells at the point when the measurement termination time T_CR_MAX has elapsed.

Consequently, in the case in which an identical cell is selected repeatedly as a local station many times because, for example, the mobile communication terminal 100 exits in a boundary of a plurality of cells, the mobile communication terminal 100 can prevent from transitioning to the rapid moving state erroneously. That is, the mobile communication terminal 100 can appropriately detect that it is moving at a high speed and can apply correct criteria for selection of a cell to perform switching of a local station.

In addition, the present invention can also be realized using a computer that operates as an ordinary mobile communication terminal without depending on a dedicated apparatus. That is, an operation program for causing a computer functioning as a mobile communication terminal to execute the above-described each processing is recorded in a predetermined memory unit, and a microprocessor such as a CPU reads out and executes the operation program, whereby the computer can be caused to function as the above-described mobile communication terminal 100.

Here, the operation program may be one that is recorded in a computer readable recording medium such as a floppy disk, a CD-ROM, an MO or a memory card and distributed. Moreover, an operation program may be stored in a file system included in an FTP (File Transfer Protocol) server or the like on the Internet and, for example, superimposed on a carrier wave to be downloaded or otherwise sent to a computer.

Effect of the Invention

As indicated by the above-description, according to the present invention, a mobile communication terminal registers cells selected as a local station in a list without duplication, thereby being able to appropriately detect that it is moving at a high speed and perform switching of the local station by correct criteria for selection of a cell.

The invention claimed is:

1. Detection for rapid moving of a mobile communication terminal that can change criteria for reselection of a cell to be criteria for switching a local station in association with a result of determining whether or not the mobile communication terminal is moving at a high speed, and compare a result of measuring qualities of radio signals with the criteria for reselection of a cell to switch a cell to be the local station, characterized in that:

the mobile communication terminal determines whether or not a cell selected as the local station is registered in a predetermined list when the mobile communication terminal reselects the cell to be the local station;

if it is determined that the cell is not registered, the mobile communication terminal registers the cell selected as the local station in said list;

when a predetermined measurement terminal time elapses, the mobile communication terminal determines whether or not the number of cells registered in said list exceeds a predetermined threshold value; and if it is determined that the number of cells exceeds the threshold value, considering that the mobile communication terminal is moving at a high speed, the mobile communication terminal changes criteria for reselection of a cell from criteria for preferentially reselecting a cell with relatively narrow coverage to criteria for preferentially reselecting a cell with relatively wide coverage.

2. The detection of rapid moving according to claim 1, characterized in that:

the cell selected as the local station is registered in said list by causing a predetermined memory unit to store data indicating identification information peculiar to the cell selected as the local station.

3. The detection of rapid moving according to claim 1, characterized in that:

coverage of a cell to be preferentially reselected if it is determined that the number of cells registered in said list exceeds the predetermined threshold value and coverage of a cell to be preferentially reselected if it is determined that the number of cells registered in said list is equal to or less than the predetermined threshold value have areas overlapping with each other.

4. The detection of rapid moving according to claim 1, characterized in that:

the cell to be preferentially reselected if it is determined that the number of cells registered in said list exceeds the predetermined threshold value is a macro-cell, and the cell to be preferentially reselected if the number of cells registered in said list is equal to or less than the predetermined threshold value is a micro-cell or a pico-cell.

5. The program according to claim 4, characterized in that:

said cell registration processing causing a predetermined memory unit to store data indicating identification information peculiar to the cell selected as the local station, thereby registering the cell selected as the local station in said list.

6. The detection of rapid moving according to claim 2, characterized in that:
coverage of a cell to be preferentially reselected if it is determined that the number of cells registered in said list exceeds the predetermined threshold value and coverage of a cell to be preferentially reselected if it is determined that the number of cells registered in said list is equal to or less than the predetermined threshold value have areas overlapping with each other.

7. The detection of rapid moving according to claim 2, characterized in that:
the cell to be preferentially reselected if it is determined that the number of cells registered in said list exceeds the predetermined threshold value is a macro-cell, and the cell to be preferentially reselected if the number of cells registered in said list is equal to or less than the predetermined threshold value is a micro-cell or a pico-cell.

8. The detection of rapid moving according to claim 3, characterized in that:
the cell to be preferentially reselected if it is determined that the number of cells registered in said list exceeds the predetermined threshold value is a macro-cell, and the cell to be preferentially reselected if the number of cells registered in said list is equal to or less than the predetermined threshold value is a micro-cell or a pico-cell.

9. A mobile communication terminal comprising means for sending and receiving radio signals to and from a base station to perform communication, cell information memory and processing control unit, wherein criteria for reselection of a cell is changed in association with a result of determining whether or not the mobile communication terminal is moving at a high speed, the criteria for reselection of cell being criteria for switching a local station, and a result of measuring qualities of the radio signals is compared with the criteria for reselection of a cell to switch a cell to be the local station, wherein said processing control unit
determines whether or not a cell selected as the local station is registered in a predetermined list at said cell information memory when the mobile communication terminal reselects the cell to be the local station;
if it is determined that the cell is not registered, registers the cell selected as the local station in said list;
when a predetermined time duration of measuring the qualities of the radio signal elapses, determines whether or not the number of cells registered in said list exceeds a predetermined threshold value; and
if it is determined that the number of cells exceeds the threshold value, assuming that the mobile communication terminal is moving at a high speed, changes criteria for reselection of a cell from criteria for preferentially reselecting a cell with relatively narrow coverage to criteria for preferentially reselecting a cell with relatively wide coverage.

* * * * *